(12) United States Patent
Oh et al.

(10) Patent No.: US 6,443,997 B1
(45) Date of Patent: Sep. 3, 2002

(54) REACTIVE BLACK DYE COMPOSITIONS FOR CELLULOSE FIBERS

(75) Inventors: Sea Wha Oh; Myeong Nyeo Kang; Tae Kyung Kim; Mi Kyoung Song, all of Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/646,952

(22) PCT Filed: Mar. 26, 1999

(86) PCT No.: PCT/KR99/00146

§ 371 (c)(1),
(2), (4) Date: Nov. 20, 2000

(87) PCT Pub. No.: WO99/48987

PCT Pub. Date: Sep. 30, 1999

(30) Foreign Application Priority Data

Mar. 26, 1998 (KR) .............................................. 98/10610

(51) Int. Cl.[7] .......................... C09B 67/24; D06P 1/384

(52) U.S. Cl. ..................................... 8/549; 8/641; 8/918
(58) Field of Search ............................. 8/641, 549, 918

(56) References Cited

U.S. PATENT DOCUMENTS

| 5,690,698 A | | 11/1997 | von der Eltz et al. |
| 6,086,639 A | * | 7/2000 | Steckelberg |
| 6,126,700 A | * | 10/2000 | Bao-Kun et al. |

* cited by examiner

Primary Examiner—Margaret Einsmann
(74) Attorney, Agent, or Firm—Finnegan, Henderson, Farabow, Garrett & Dunner, L.L.P.

(57) ABSTRACT

The present invention relates to a reactive black dye composition for cellulose fiber and more particularly, to the reactive black dye composition with excellent several fastnesses, dyeing levelness, reproducibility and dyeing yield, comprising a mixture with a certain amount ratio of an orange reactive dye expressed in formula (1) and black dye expressed in formula (2), wherein Z is —$OSO_3M$ or $OC(O)CH_3$; and M is an alkaline metal atom.

1 Claim, No Drawings

REACTIVE BLACK DYE COMPOSITIONS FOR CELLULOSE FIBERS

BACKGROUND OF THE INVENTION

1. Field of the Invention

The present invention relates to a reactive black dye composition for cellulose fiber and more particularly, to the reactive black dye composition with excellent several fastnesses, dyeing levelness, reproducibility and dyeing yield, comprising a mixture with a certain amount ratio of an orange reactive dye expressed in the following formula 1 and black dye expressed in the following formula 2:

Formula 1

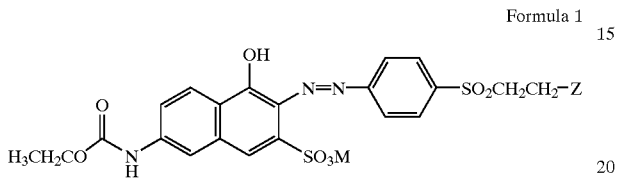

Formula 2

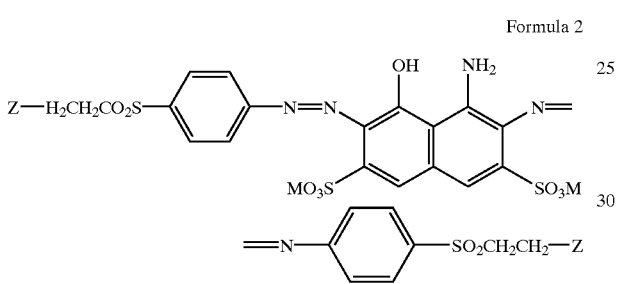

wherein Z is —OSO$_3$M or OC(O)CH$_3$; and M is an alkaline metal atom.

2. Description of the Related Art

A black dye is the most frequently consumed dyes of all dyes. Most of black dyes are employed as a mixture of several dyes rather than alone. likewise, the black dye is the most applicable one as reactive dye and most of black dye for cellulose fiber on the market is a mixture of C. I. Reactive Black 5 represented in the following formula 2a and orange dye:

Formula 2a

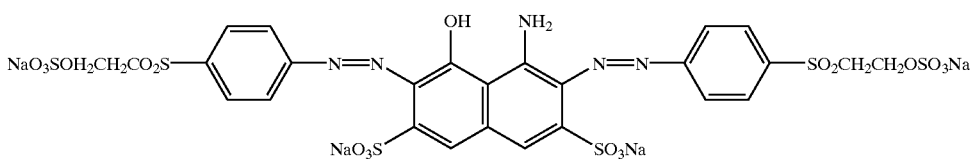

However, vinylsulfone-based orange dye used for mixing colors to prepare the black dye has low several fastnesses, especially light fastness and poor fixation relative to other dyes, which results in wastefulness and difficulty in adjusting tone.

In an effort to overcome aforementioned problems of vinylsulfone-based orange dye used for mixing colors to prepare the black dye, the inventors have researched to synthesize a novel orange dye. As a result, they provided a orange reactive dye expressed in the above formula (1), which shows not only enhanced several fastnesses such as light fastness, washing fastness, perspiration fastness and chlorine fastness but also better dyeing yield relative to other orange dyes with mono-reactive group.

SUMMARY OF THE INVENTION

The inventors completed this invention in such a manner that the novel orange reactive dye expressed in the above formula (1), which is synthesized by the inventors and the conventional black reactive dye expressed in the above formula (2) are mixed in a certain amount ratio, thereby reducing wastefulness of dye due to higher fixation of the orange reactive dye and improving several fastnesses such as light fastness during dyeing of cellulose fiber, in addition to feasibility of mixing colors.

Accordingly, an object of this invention is to provide a reactive black dye composition for cellulose fiber having excellent several fastnesses, dyeing levelness, reproducibility and dyeing yield

DETAILED DESCRIPTION OF THE INVENTION

This invention is characterized by a reactive black dye composition for cellulose fiber comprising a mixture in which an orange reactive dye expressed in the following formula 1 and black dye expressed in the following formula 2 is mixed in the range of 15–35 wt %: 65–85 wt %:

Formula 1

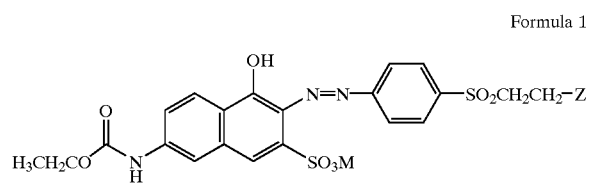

Formula 2

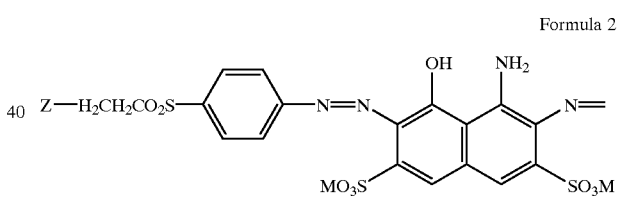

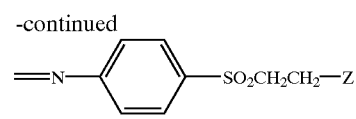

wherein Z is —OSO$_3$M or OC(O)CH$_3$; and M is an alkaline metal atom.

This invention is explained in more detail as set forth:

The reactive black dye composition of this invention is prepared in such a manner that the black dye expressed in the formula 2 is mixed with the orange reactive dye expressed in the formula 1 in a certain amount ratio and thus leads to excellent color yield, property of build-up, reproducibility, dyeing levelness and several fastnesses, especially feasibility of mixing due to lower wastefulness of orange dye during washing.

The process for preparing the novel orange reactive dye is expressed as the following Scheme 1:

Scheme 1

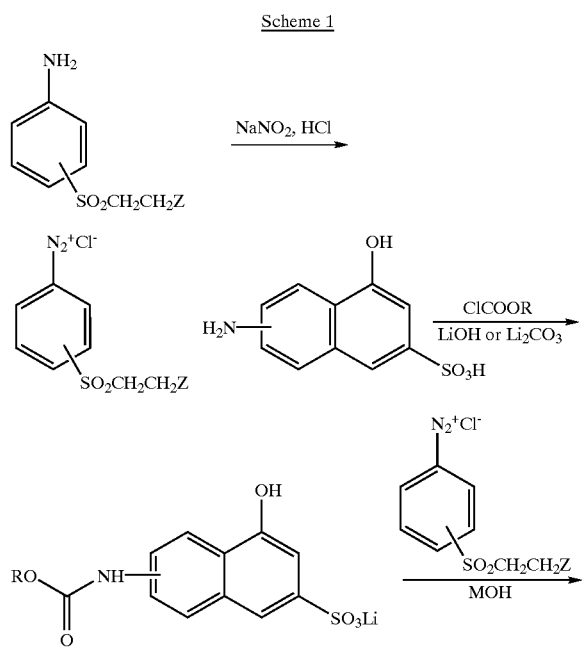

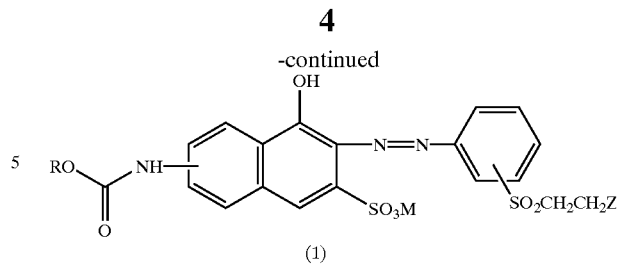

(1)

wherein M is an alkaline metal atom; Z is —OSO$_3$M or OC(O)CH$_3$; and R is alkyl group having 1–4 of carbon atom.

The process for preparing the orange reactive dye represented in the above Scheme 1 is as follows:

First, aminophenyl-β-ethylsulfone derivative is diazo nated. In addition, alkyl chloroformate is slowly added to neutralized solution of 6(7)-amino4-hydroxy-2-naphthalene sulfonic acid at 0–25° C. in the presence of LiOH or Li$_2$CO$_3$ for adjusting pH to be 3–6, which leads to condensation reaction, thus preparing 6(7)-alkoxycarbonylamino-4-hydroxy-2-naphthalene sulfonic acid.

Then, the diazo solution and the condensation solution are mixed at 0–5° C., after which the mixture is subjected to coupling reaction with the addition of base to adjust pH to be lower than 6.5, finally preparing vinylsulfone-based orange reactive dye.

Among the black dye used in the composition of this invention, the black dye expressed in the following formula 2a of which Z is —OSO$_3$Na, has been commercialized by many companies since REMAZOL Black B™(Hoechst, German) was on the market in 1960s.

Formula 2a

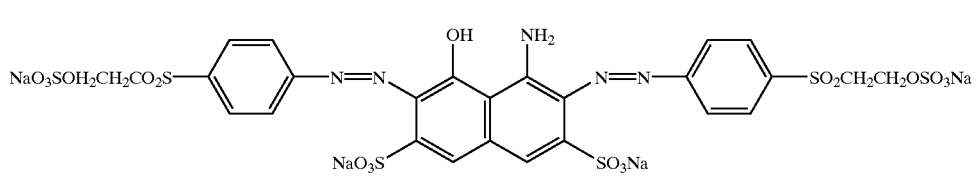

Further, the black dye expressed in the following formula 2b of which Z is —OCOCH$_3$, is novel one prepared by the inventors.

Formula 2b

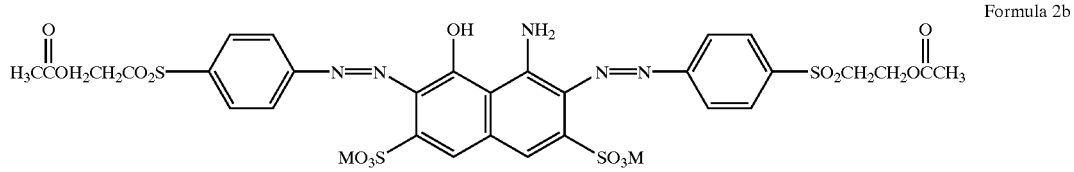

wherein M is an alkaline metal atom.

The process for preparing the novel black reactive dye is expressed as the following Scheme 2:

Scheme 2

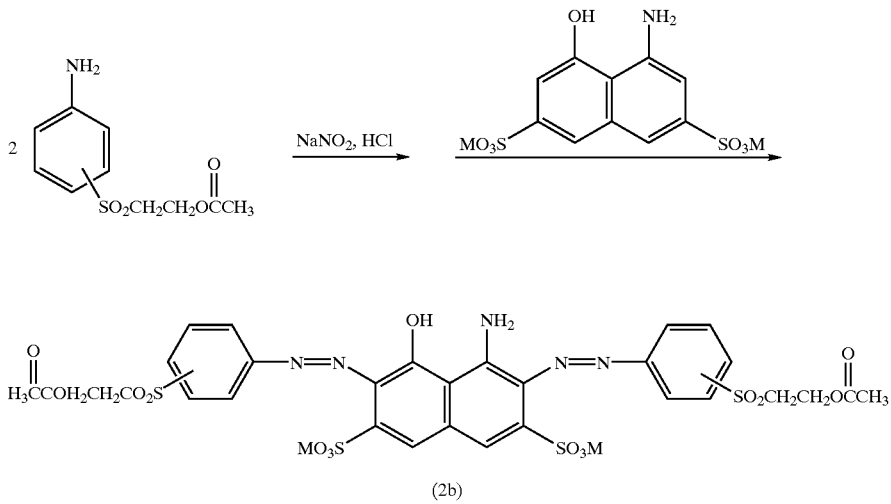

(2b)

wherein M is an alkaline metal atom.

The process for preparing the black reactive dye represented in the above Scheme 2 is as follows:

First, aminophenyl-β-acetoxyethylsulfone derivative is diazo tized. In addition, 1-naphthol-8-amino-3,6-disulfonic acid is neutralized with a base. Then, the diazo solution and the condensation solution are mixed at 0–5° C., after which the mixture is agitated with the addition of base to adjust pH to be lower than 7, finally preparing black reactive dye represented in the above formula 2b.

The reactive black dye composition of this invention comprises a mixture in which the orange reactive dye expressed in the following formula 1 and black dye expressed in the following formula 2 is mixed in the range of 15–35 wt % : 65–85 wt %, more preferably in the range of 20–30 wt % : 70–80 wt %. If the amount of the orange reactive dye is lower than 15 wt %, the dye composition becomes bluish black; in the case of exceeding 35 wt %, the dye composition yellowish black.

In addition, if deemed necessary the reactive black dye composition of this invention further includes inorganic salt such as sodium sulfonate and sodium chloride; dispersant; agent of inhibition of raising dust; pH stabilizer; sequestering agent for water such as polyphosphate; and other conventional dye preparation.

The reactive black dye composition of this invention shows excellent color yield, property of build-up, reproducibility and so on. Further to this, dyed fabric with the reactive black dye composition of this invention exhibits excellent several fastnesses such as light fastness, washing fastness, perspiration fastness and chlorine fastness and feasibility of mixing due to lower wastefulness of orange dye during washing.

The following specific examples are intended to be illustrative of the invention and should not be construed as limiting the scope of the invention as defined by appended claims.

PREPARATIVE EXAMPLE 1

Formula 1a

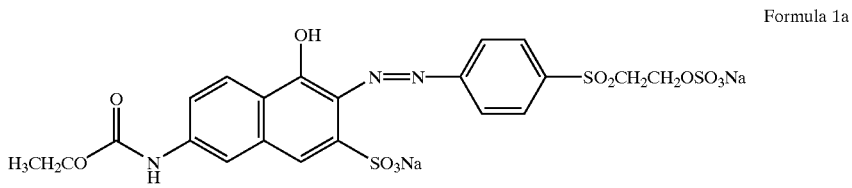

First, 59.07 g(0.21 mol) of 4-aminophenyl-β-sulfatoethylsulfone was dispersed in 420 ml of water and 43.5 ml of 35% HCl was added at 0–5° C., followed by the addition of ice (100 g). Then, 67 ml of $NaNO_2$ was added to the reaction mixture for the purpose of diazolation, after which excess of nitrous acid was removed with the addition of sulfamic acid.

800 ml of $H_2O$ was added to 47.85 g (0.2 mol) of 7-amino-4-hydroxy-2-naphthalene sulfonic acid and was then neutralized with 40 ml of aqueous solution of 5N LiOH, followed by the addition of 150 g of ice. Thereafter, 23.87 g (0.22 mol) of ethyl chloroformate was slowly added to the reaction mixture in the presence of aqueous solution of LiOH for adjusting pH to be 3–6, which leads to condensation reaction.

Then, the prepared diazo solution was added to the prepared ethyl chloroformate condensation solution and upon adjusting pH to be 5–6.5 with aqueous solution of NaOH, the coupling reaction was completed at 0–5° C. Finally, the resulting mixture was spray-dried and prepared vinylsulfone-based orange reactive dye.

$^1$H-NMR(300 MHz, DMSO-$d_6$): δ1.26(3H, t), 3.63(2H, t), 3.95(2H, t), 4.17(2H, q), 7.40(1H, s), 7.61(1H, d), 7.75 (1H, s), 7.88(2H, d), 7.92(2H, d), 8.15(1H, d), 10.24(1H, s), 15.56(1H, s).

PREPARATIVE EXAMPLE 2

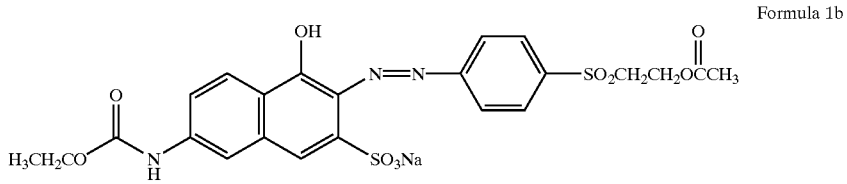

Formula 1b

First, 12.17 g (0.05 mol) of 4-aminophenyl-β-acetoxyethylsulfone was dispersed in 125 ml of water and 16.8 ml of 3N NaNO$_2$ was added at 0–5° C., followed by the addition of ice (30 g). Then, 10.9 ml of 35% HCl was added to the reaction mixture for the purpose of diazofization, after which excess of nitrous acid was removed with the addition of sulfamic acid.

150 ml of H$_2$O was added to 11.96 g (0.05 mol) of 7-amino-4-hydroxy- 2-naphthalene sulfonic acid and was then neutralized with 10 ml of aqueous solution of 5N LiOH, followed by the addition of 70 g of ice Thereafter, 5.97 g (0.055 mol) of ethyl chloroformate was slowly added to the reaction mixture in the presence of aqueous solution of LiOH for adjusting pH to be 3–6, which leads to condensation reaction.

Then, the prepared diazo solution was added to the prepared ethyl chloroformate condensation solution and upon adjusting pH to be 5–6.5 with aqueous solution of NaOH, the coupling reaction was completed at 0–5° C. Finally, the resulting mixture was salted-out and filtered, thus preparing vinylsulfone-based orange reactive dye.

$^1$H-NMR(300 MHz, DMSO-d$_6$): δ1.26(3H, t), 1.77(3H, s), 3.71(2H, t), 4.17(2H, q), 4.26(2H, t), 7.40(1H, s), 7.61 (1H, d), 7.75(1H, s), 7.89(2H, d), 7.94(2H, d), 8.14(1H, d), 10.24(1H, s), 15.53(1H, s).

PREPARATIVE EXAMPLE 3

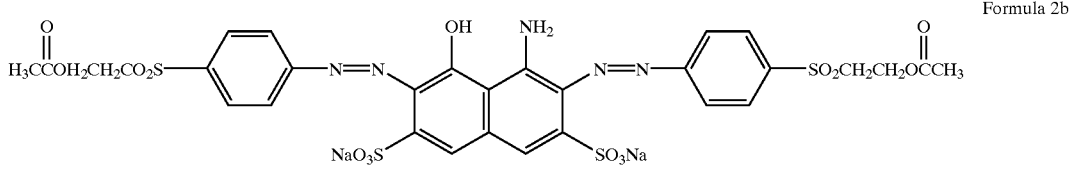

Formula 2b

First, 26.76 g (0.11 mol) of 4-aminophenyl-β-acetoxyethylsulfone was dispersed in 200 ml of H$_2$O and 40 ml (0.12 mol) of 3N NaNO$_2$ was added at 0–5° C., followed by the addition of ice (90 g). Then, 24.0 ml (0.276 mol) of 35% HCl was added to the reaction mixture for the purpose of diazotization, after which excess of nitrous acid was removed with the addition of sulfamic acid.

200 ml of H$_2$O was added to 15.97 g (0.05 mol) of 1-naphthol- 8-amino-3,6-disulfonic acid and was then neutralized with 2.0 g (0.05 mol) of NaOH, followed by cooling to 0–5° C.

Then, the prepared diazo solution was added a time to the neutralized solution of 1-naphthol-8-amino-3,6-disulfonic acid, after which aqueous solution of NaOH was slowly added so as to adjust pH to be lower than 7. Meanwhile, 30 g of ice was added three times to suppress an elevation of reaction temperature in the middle of reaction. Finally, the reaction mixture was agitated for 4 hours and spray-dried, thus preparing the black reactive dye.

$^1$H-NMR(300 MHz, DMSO-d$_6$): δ1.75(3H, s), 1.77(3H, s), 3.73(2H, t), 3.79(2H, t), 4.28(4H, q), 7.42(1H, s), 7.48 (1H, s), 7.92(2H, d), 8.00(2H, d), 8.00(2H, d), 8.03(2H, d), 8.26(2H, d), 10.41(1H, s), 10.61(1H, s), 15.36(1H, s).

EXAMPLES

The dyes was added to 25 ml of H$_2$O in accordance with the ratio of mixing colors specified in the following Table 1 and then dissolved, followed by the addition of cotton (2 g). Thereafter, the mixture was heated to 30° C. and 1.5 g of sodium sulfate was added.

Upon heating to 50° C., 0.5 g of sodium carbonate was added and dyed for 60 mins, followed by the washing with cold water. The dyed cotton washed with cold water was put in a soaping solution (nonionic surfactant) and was cleaned two times for 20 mins at 98° C. in accordance with bathing ratio of 1:20, after which it was washed and dried.

Following the above dyeing process, fastness, dyeing yield, dyeing levelness and reproducibility of the dyed cotton were evaluated as follows and the results are represented in the following Table 2:

Evaluation on Fastness

Light fastness was evaluated according to KS K 0218 direct-illumination method, washing fastness according to KS K 030 A-4, perspiration fastness according to AATCC Method 14 and chlorine fastness according to JIS-0884-1983.

Evaluation on Dyeing Yield

The value was calculated according to the following equation:

$$[1-(A/Ao)] \times 100 \qquad (1)$$

wherein, Ao is absorbance of dye bath prior to dyeing; and A is the sum of absorbance of remaining bath after dyeing and washing.

Evaluation on Dyeing Levelness

This property was evaluated with naked eyes; if petty specks are not observed, the property may be deemed good.

Evaluation on Reproducibility

This property was evaluated with dyeing yield and tone of color after dyeing three times; if the dyeing yield is within 3% of error and the difference of color (,E) derived from CCM is lower than 0.5, the property may be deemed good.

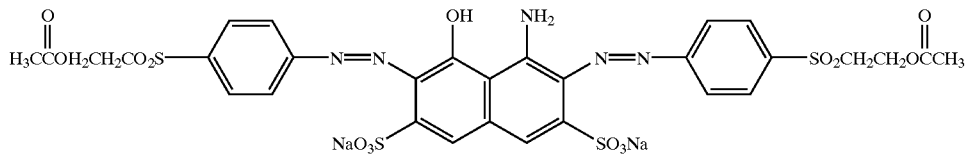

TABLE 1

| Category | | Dye composition | |
|---|---|---|---|
| | | Orange reactive dye | Black reactive dye |
| Example | 1 | Formula 1a, 0.024 g (1.2% o.w.f.) | Formula 2a, 0.076 g (3.8 o.w.f.) |
| | 2 | Formula 1a, 0.022 g (1.1% o.w.f.) | Formula 2b, 0.062 g (3.1 o.w.f.) |
| | 3 | Formula 1b, 0.026 g (1.3% o.w.f.) | Formula 2a, 0.076 g (3.8 o.w.f.) |
| | 4 | Formula 1b, 0.024 g (1.2% o.w.f.) | Formula 2b, 0.064 g (3.2 o.w.f.) |
| Comparative example | | Trademark: Reactazol; Amount of dye: 0.12 g (6% o.w.f.) | |

TABLE 2

| | Fastness (degree) | | | | Dyeing yield (%) | | Dyeing levelness | Reproducibility |
|---|---|---|---|---|---|---|---|---|
| Category | Light | Washing | Perspiration | Chlorine | 500 nm | 600 nm | | |
| Exam 1 | 4–5 | 5 | 5 | 4 | 84 | 89 | Good | Good |
| Exam 2 | 4–5 | 5 | 5 | 4 | 84 | 90 | Good | Good |
| Exam 3 | 4–5 | 5 | 5 | 4 | 83 | 89 | Good | Good |
| Exam 4 | 4–5 | 5 | 5 | 4 | 83 | 90 | Good | Good |
| Reactrazol ™ | 4 | 5 | 5 | 4 | 74 | 89 | Good | Good |

As shown in Table 2, the black reactive dye composition of examples 1–4 according to this invention is commercially valuable due to excellence of several physical properties; it is economical since the amount of orange dye used may be saved due to better dyeing yield of orange dye relative to conventional black dye (Reactazol™) and time period for washing may be shortened; especially, its light fastness is enhanced.

As explained above, it is evident th tat the black reactive dye of this invention exhibits excellent several fastnesses, dyeing yield, dyeing levelness and reproducibility and especially shows excellent light fastness and dyeing yield, thereby being applicable to dyeing cellulose fiber.

What is claimed is:

1. A reactive black dye composition for cellulose fiber comprising a mixture characterized in that an orange reactive dye expressed in the following formula 1 and black dye expressed in the following formula 2 is mixed in the range of 15–35 wt %: 65–85 wt %:

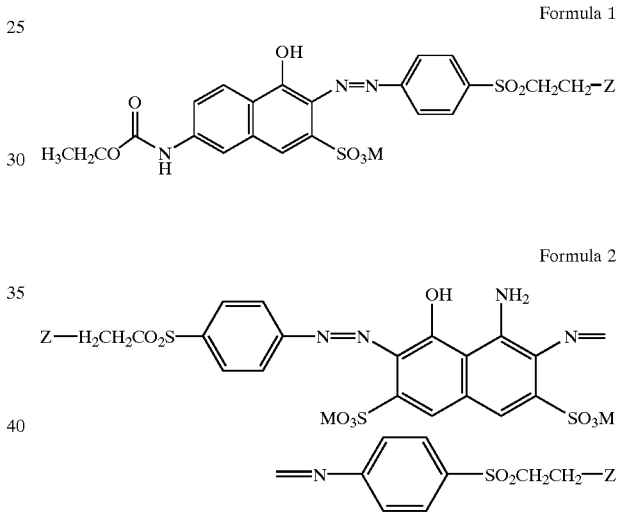

wherein Z is —OSO3M or OC(O)CH3; and M is an alkaline metal atom.

* * * * *